May 31, 1949.　　A. M. CHRISTIANO　　2,471,812
ELECTRIC MOTOR
Filed May 16, 1946

Inventor
Angelo M. Cristiano
By J. L. Walker
Attorney

Patented May 31, 1949

2,471,812

UNITED STATES PATENT OFFICE 2,471,812

ELECTRIC MOTOR

Angelo M. Cristiano, Springfield, Ohio, assignor to Robbins & Myers, Inc., Springfield, Ohio, a corporation of Ohio Application May 16, 1946, Serial No. 670,102

9 Claims. (Cl. 172—36)

This invention pertains to electric motors, and more particularly to a construction and method of damping motor generated vibration and elimination of resulting noise.

Extensive use of motor driven equipment in homes as well as in factories and commercial establishments, together with modern trends toward noise elimination, have lead to many attempts and development of a wide variety of corrective constructions and motor designs intended to minimize the transmission of vibration induced sound, to the neglect, however, of a fertile origin of such sound vibration. The purpose of the instant invention is to overcome and supply this omission.

In electric motor manufacture careful design of bearings and elimination of resonant parts have effected material reduction of mechanical noise. Special windings and improved electrical circuits have greatly minimized magnetic hum. Spring mountings and resilient supporting cushions have been utilized to prevent transmission of vibrations and sound to the appliance or apparatus with which the motor may be operatively connected. It has been discovered, however, that a prolific source of noise vibration arises from torque pulsations of the motor.

The present invention contemplates the absorption or damping of noise producing vibrations from whatever source generated by motor operation, by isolating the entire motor operating structure not only from its support and the driven apparatus, but also from the motor housing or casing.

The object of the invention is to improve the construction as well as the mode of operation of anti-vibration and noise eliminating features of electric motors, whereby they may not only be economically constructed and embodied in electric motors, but will be more efficient in use, quiet in operation, uniformly responsive to a wide range of vibration frequencies, and unlikely to get out of repair.

A further object of the invention is to provide vibration damping means responsive to motor generated vibration of both mechanical and magnetic source.

A further object of the invention is to maintain accurate alignment and concentricity of the motor shaft and its bearings and rotor or armature carried thereby with the motor field ring regardless of vibratory influence.

A further object of the invention is to resiliently support the motor field ring independently of the motor housing.

A further object of the invention is to provide an electric motor embodying vibration minimizing and noise eliminating means having the advantageous structural features and inherent meritorious characteristics and mode of operation herein set forth.

With the above primary and other incidental objects in view as will more fully appear in the specification, the invention intended to be protected by Letters Patent consists of the features of construction, the parts and combinations thereof, and the mode of operation, or their equivalents, as hereinafter described or illustrated in the accompanying drawings.

In the accompanying drawings, wherein is shown the preferred but not necessarily the only form of embodiment of the invention, Fig. 1 is a longitudinal sectional view of an assembled electric motor embodying the instant invention.

Like parts are indicated by similar characters of reference throughout the several views.

Figure 1:
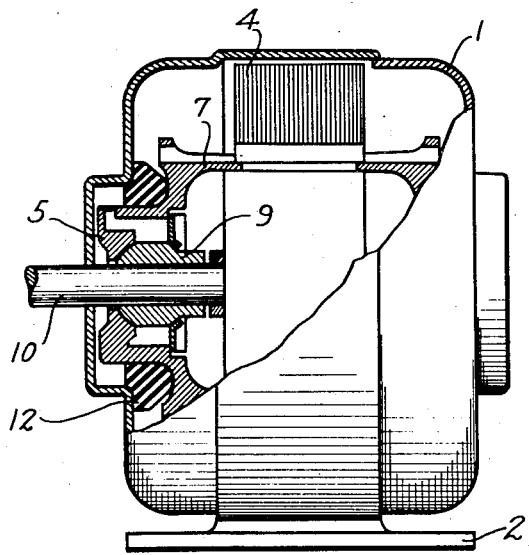
Figure 3:
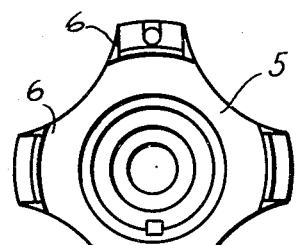
Fig. 3 is a detail view of one of the spider supports for the stator ring.
Figure 4:
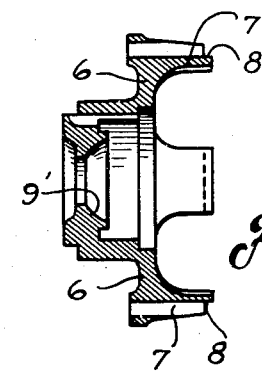
Fig. 4 is a detail sectional view thereof.
Figure 2:
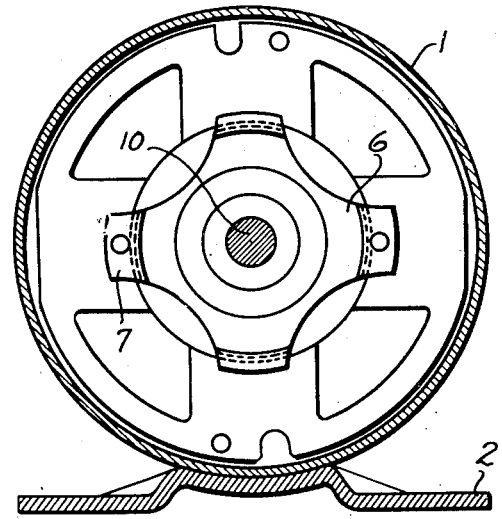
Fig. 2 is a transverse sectional view of the housing and base, showing the stator or field ring and supporting spider therein in isolated relation with the housing.
Figure 5:
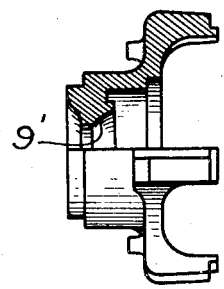
Fig. 5 is a side elevation, partly in section, of the stator ring supporting spider.
Figure 6:
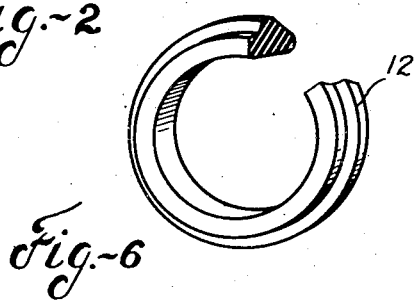
Fig. 6 is a detail view, partly broken away, of the resilient vibration damping ring.

One of the characteristic features of the present invention is the fact that the motor, per se, including the stator or field ring, the rotor or armature and the windings, the rotor or drive shaft and its bearings, are maintained in constant relation with each other as a unitary assembly which is resiliently supported as a semi-floating or fluctuating unit, in relation with its enclosing housing or casing and its supporting base.

Referring to the drawings, 1 indicates the motor housing or frame, of which 2 is the supporting base. Located within the frame or casing 1, but in non-contacting relation therewith, is a complete electric motor including a conventional stator or field ring 4 which is mounted upon a pair of supporting spiders. Each spider support includes a central hub 5, from which radially project a series of equally spaced arms 6, of which but four arms are shown. Obviously the number of arms 6 may be greater or less than those illustrated. From the extremity of each radial arm 6 there project in an axial direction an equal number of parallel peripherally spaced arms 7—7.

The laterally extending arms 7—7 are relatively short, and each is provided at its end with a small offset or rabbet 8. There are two such spiders arranged in opposing axially aligned spaced relation. The stator ring 4 is positioned in an intermediate plane between the opposing spider supports and is seated in the terminal rabbets 8 of the several spider arms 7, which engage the stator ring 4 from its opposite sides. Within the hubs 5 of the opposing ring supporting spiders are conventional self-aligning bearings 9 adjustably seated in concave bearings 9' of the spiders. The particular bearings form no part, per se, of the invention. Other types of shaft bearings may be substituted therefor. Journaled in the bearings 9 is a rotor or motor drive shaft 10 which is fixedly secured in a conventional rotor or armature 11 for unison rotation therewith.

Interposed between the hubs 5 of the spider supports and the surrounding heads of the motor casing 1 are annular resilient damping rings 12, on which the complete motor assembly as before described, comprising the stator or field ring, spider supports therefor, the rotor or armature, the shaft, and its bearings, is yieldingly suspended. The construction is such that fluctuations of the motor assembly against the yielding resistance of the damping rings 12 does not disturb or affect the interrelation of the motor assembly parts. To the contrary, the resilient rings 12 will absorb the motor generated vibrations, whether mechanical or electrical, including those resulting from torque pulsations and will effectively minimize their transmission to the casing 1 and base 2, and prevent audible reaction thereof.

The motor assembly being out of direct contact with the housing and its base, and being yieldingly supported solely by the resilient damping rings 12, vibrates as a unit independently of and relative to its housing or casing 1 and base 2, without in any way disturbing or changing the relation of the motor assembly elements, and without transmitting its vibratory action to the housing.

The results of the invention are not dependent upon the particular type of motor, but the improvement is applicable to motors of various types and design wherein the problem of excessive vibration and noise is encountered, the transmission of which to resonant bodies it is desired to minimize.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. An electric motor, a stator ring supported in peripherally spaced relation with an enclosing housing, an armature journaled for rotation in concentric relation with the stator ring, a mounting support common to the stator ring and to the rotor and a resilient body interposed between the common support and the enclosing housing, the construction and arrangement being such that induced vibration is compensated and noise minimized.

2. An electric motor including an enclosing housing, a supporting member enclosed within the housing and connected therewith, a stator ring within the inner periphery of which the supporting member is engaged to support said ring, a rotor disposed concentrically within the stator ring, a bearing in the supporting member for the rotor, and a resilient ring within the housing interposed between the supporting member and the housing upon which the stator ring and rotor are carried independently of other connection with the housing.

3. A vibration and noise suppression electric motor structure, including a housing, a stator ring therein supported in spaced relation with the housing, a rotor disposed in concentric relation with the stator ring, supporting means engaging the inner periphery of the stator ring, a journal bearing for the rotor in the supporting means, and a resilient body within the housing interposed between the supporting means and the housing.

4. A vibration and noise suppression electric motor structure, including an enclosing housing, a stator ring supported therein in spaced relation with the housing, a pair of oppositely disposed supporting members within the housing, peripheral bearing surfaces thereon engageable with the inner circumference of the stator ring, journal bearings in the supporting members, a rotor journaled in said bearings concentrically with the stator ring, hubs on the outer faces of the supporting members, resilient rings within the housing surrounding said hubs and seated upon the housing for absorbing operation generated vibration and noise.

5. In an electric motor, a vibration and noise suppression structure, including a motor frame, and a complete assembly of motor components comprising a stator ring, a rotor, journal bearings for the rotor and supporting means for the rotor bearings connected with the stator ring, and resilient cushion rings interposed between the motor assembly and the surrounding motor frame.

6. In an electric motor, a vibration and noise suppression structure, including an enclosing frame, and a complete assembly of motor components comprising a stator ring, a rotor, journal bearings for the rotor and supporting means for the rotor bearings connected with the stator ring, mounted in the frame independently of direct rigid connection between any of the component parts thereof and the surrounding frame.

7. In an electric motor, a vibration and noise suppression structure, including a frame, a complete assembly of motor components comprising a stator ring, a rotor, journal bearings for the rotor, and supports connecting the journal bearings with the stator ring enclosed within the frame, and resilient supporting means within the frame interposed between the motor assembly and the frame.

8. An electric motor, including a housing, a complete assembly of motor components comprising a pair of oppositely disposed spiders, each comprising an outwardly directed hub and a plurality of radially disposed arms, rabbeted seats on the extremities of the arms, a stator ring interiorly seated in the rabbeted seats of the spider arms, journal bearings adjustably mounted in the hubs of the spiders, and a rotor journaled in the bearings all enclosed within the housing, and annular peripherally resilient rings surrounding the spider hubs and engaging interior contiguous portions of the housing, said resilient rings being the sole supports of the motor assembly within the housing.

9. An electric motor, including a housing, a stator ring therein supported in peripherally spaced relation therewith, a rotor, journal bearings for the rotor, mounting members common to the journal bearings and stator ring supporting said assembly within the housing in spaced relation therewith and resilient bodies connecting the mounting members with the housing, the construction and arrangement being such that operation induced vibration and noise is intercepted by the resilient bodies and transmission thereof to the housing is prevented.

ANGELO M. CRISTIANO.

REFERENCES CITED

The following references are of record in the file of this patent:

UNITED STATES PATENTS

| Number | Name | Date |
| --- | --- | --- |
| 1,832,368 | Ell | Nov. 17, 1931 |
| 1,860,883 | Bilde | May 31, 1932 |
| 2,089,601 | Faber | Aug. 10, 1937 |
| 2,107,819 | Faber | Feb. 8, 1938 |
| 2,282,174 | Else | May 5, 1942 |